J. P. COOK.
Lawn Mower.
No. 69,409.
Patented Oct. 1, 1867.
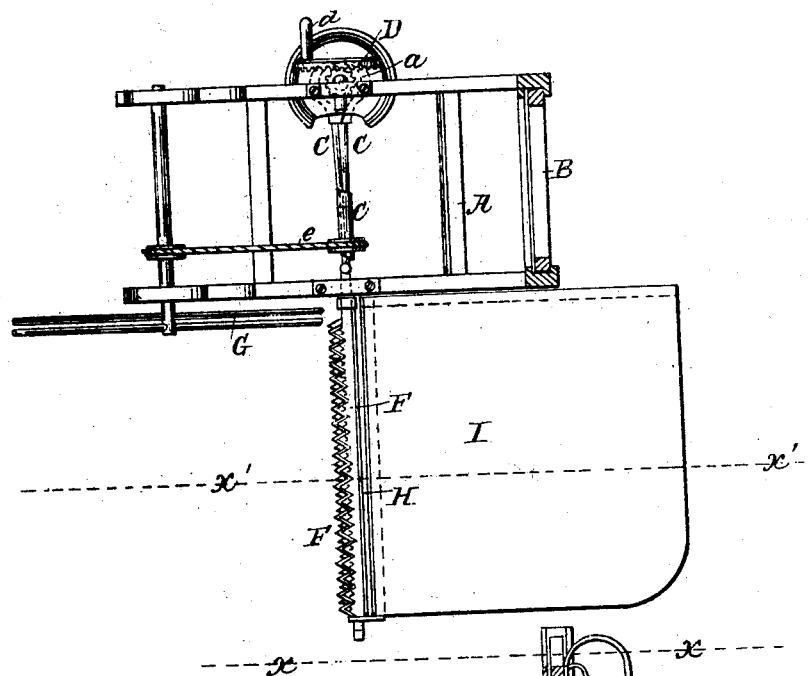
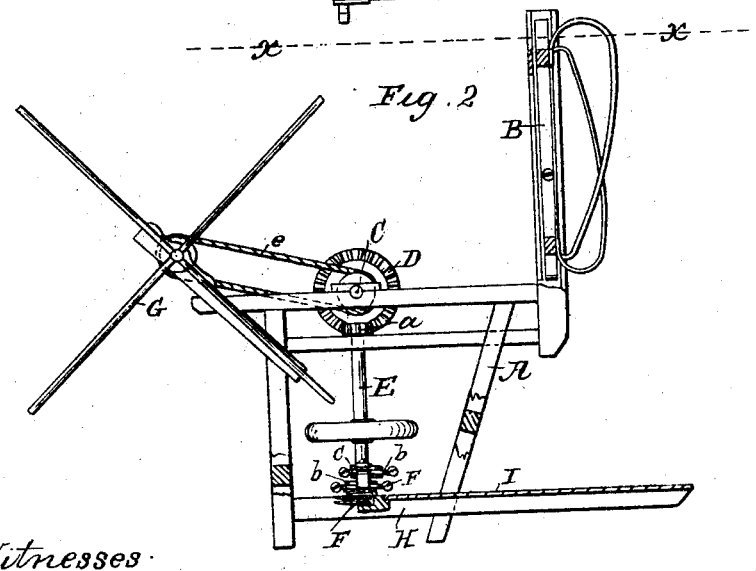

United States Patent Office.

JOSEPH P. COOK, OF ROCKVILLE, INDIANA, ASSIGNOR TO HIMSELF AND JOHN T. CAMPBELL, OF SAME PLACE.

Letters Patent No. 69,409, dated October 1, 1867.

IMPROVEMENT IN HAND-REAPERS AND MOWERS.

*The Schedule referred to in these Letters Patent and making part of the same.*

TO ALL WHOM IT MAY CONCERN:

Be it known that I, JOSEPH P. COOK, of Rockville, in the county of Parke, and State of Indiana, have invented a new and improved Hand-Reaper; and I do hereby declare that the following is a full, clear, and exact description thereof, which will enable others skilled in the art to make and use the same, reference being had to the accompanying drawings forming part of this specification, in which—

Figure 1 is a plan or top view of my invention, the upper part of the framing being in section, as indicated by the line $x\,x$, fig. 2.

Figure 2, a side sectional view of the same, taken in the line $x'\,x'$, fig. 1.

Similar letters of reference indicate like parts.

This invention relates to a new and improved reaper, to be operated manually, and is designed to supersede the ordinary scythe and cradle, by rendering the work less laborious, and capable of being performed more expeditiously.

A represents a framing, which may be constructed in any proper manner, to support the working parts, and having at its rear part a sliding or adjustable yoke, B, to which straps or other suitable fixture may be attached, for the purpose of suspending the machine from the shoulders of the operator. C is a driving-shaft placed on the framing A, and having a toothed wheel, D, on one end of it, which gears into a pinion, $a$, on a vertical shaft, E, having two eccentrics $b\,b$ upon it, from which two sickles, F F, are driven by connecting-rods $c\,c$. The sickles F F work one over the other, the eccentrics $b\,b$ being placed in reverse positions on the shaft E, so that the two sickles will be moved simultaneously in opposite directions. The sickles are operated by turning the wheel D, it being provided with a handle, $d$, for the purpose. A reel, G, is used with the machine, the reel being driven by a belt, $e$, from the shaft. This device may be carried by the operator with the greatest facility, and the sickles made to cut around stumps, rocks, and other obstructions, without any difficulty whatever, and without a very great expenditure of power. The whole device will weigh from twelve to fifteen pounds, and may be constructed at a cost of from fifteen to twenty-five dollars. It is designed to have the sickles cut a swath about two feet wide. The implement may be adjusted higher or lower, to cut the grass or grain at a greater or less height, by adjusting the yoke B higher or lower. The sickles work on or in front of a bar, H, to which a grain-platform, I, is attached when grain is to be cut. The operator can rake the cut grain from I with his left hand, the right hand at the same time turning the wheel D.

Having thus described my invention, what I claim as new, and desire to secure by Letters Patent, is—

A hand-reaper, or one designed for manual operation, composed of a framing, A, having two reciprocating sickles F F attached, and operated by eccentrics or their equivalents, and suitable gearing, simultaneously in opposite directions, substantially as shown and described.

I further claim the adjustable yoke B, in the framing A, for the purpose specified.

The above specification of my invention signed by me this 17th day of September, 1866.

JOSEPH P. COOK.

Witnesses:
JAS. T. JOHNSTON,
J. J. WALKER.